United States Patent
Shiraishi et al.

(10) Patent No.: US 12,398,282 B2
(45) Date of Patent: Aug. 26, 2025

(54) TEXTILE PRINTING INKJET INK AND IMAGE FORMING METHOD

(71) Applicant: Konica Minolta, Inc., Tokyo (JP)

(72) Inventors: Masaharu Shiraishi, Hino (JP); Masaki Nakamura, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 187 days.

(21) Appl. No.: 18/352,353

(22) Filed: Jul. 14, 2023

(65) Prior Publication Data

US 2024/0034897 A1  Feb. 1, 2024

(30) Foreign Application Priority Data

Jul. 29, 2022  (JP) ................. 2022-121597

(51) Int. Cl.
*C09D 11/322* (2014.01)
*D06P 5/30* (2006.01)

(52) U.S. Cl.
CPC ............. *C09D 11/322* (2013.01); *D06P 5/30* (2013.01)

(58) Field of Classification Search
None
See application file for complete search history.

(56) References Cited

U.S. PATENT DOCUMENTS

2020/0239717 A1* 7/2020 Sato ................ C09D 11/322

FOREIGN PATENT DOCUMENTS

| EP | 3666834 A1 | 6/2020 |
| JP | 2009215506 A | 9/2009 |
| JP | 2019031611 A | 2/2019 |
| JP | 2020007543 A | 1/2020 |
| JP | 2021014516 A | 2/2021 |

OTHER PUBLICATIONS

European Patent Office, "Extended European Search Report", dated Feb. 12, 2024, which was issued in connection with the related European patent application No. 23185303.7, 7 pages.

* cited by examiner

*Primary Examiner* — Scott A Richmond
(74) *Attorney, Agent, or Firm* — LUCAS & MERCANTI, LLP

(57) ABSTRACT

A textile printing inkjet ink includes: a pigment; a water-dispersible resin; and an aqueous medium, wherein the water-dispersible resin has tensile strength of 0.1 to 4.5 MPa at 25° C. and breaking elongation of 500 to 1500% at 25° C.

7 Claims, 1 Drawing Sheet

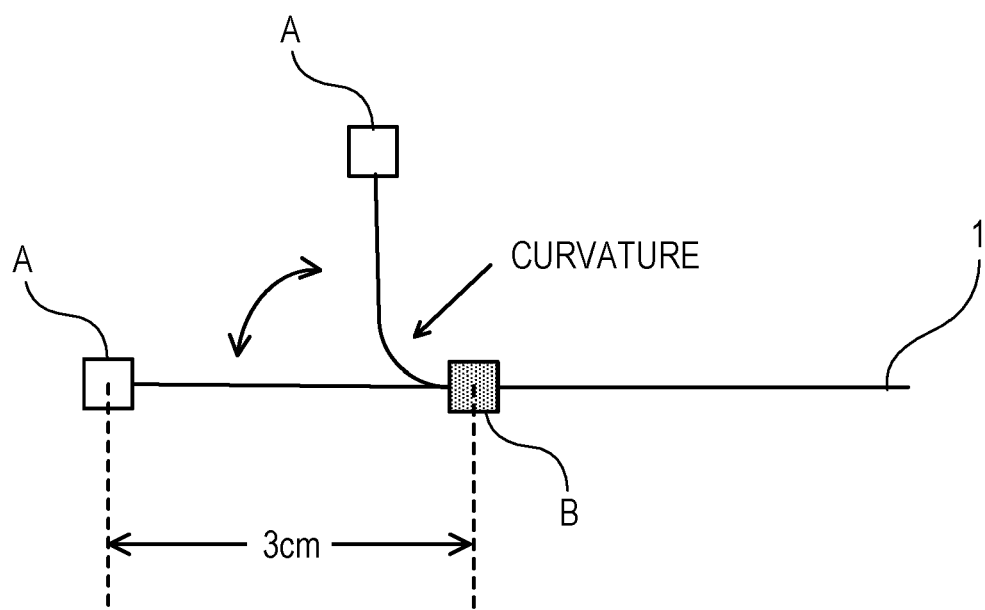

TEXTILE PRINTING INKJET INK AND IMAGE FORMING METHOD

The entire disclosure of Japanese patent Application No. 2022-121597, filed on Jul. 29, 2022, is incorporated herein by reference in its entirety.

BACKGROUND

Technological Field

The present invention relates to a textile printing inkjet ink and an image forming method.

Description of the Related Art

As a textile printing method, exhaustive textile printing is conventionally known in which textile printing is performed by immersing a fabric in a bath filled with a dye, but since dyeing takes a long time, production efficiency is low. In recent years, so-called inkjet textile printing has been widely performed in which an image is formed on a fabric by an inkjet method because dyeing can be performed in a short time, production efficiency is high, and the like.

In inkjet textile printing, ink microdroplets are discharged from an inkjet recording head and landed on a fabric to form an image. As an ink used in inkjet textile printing, a dye ink is mainly used, but use of a pigment ink capable of omitting a post-treatment such as a washing step of washing away a dye that has not been dissolved or reacted has been studied.

The pigment ink exhibits high color developability by causing pigment particles to be retained on a surface of a fabric, but has lower fixability of the pigment particles and tends to have poorer friction fastness than the dye ink. Therefore, studies have been made to enhance the fixability of the pigment particles and to enhance the friction fastness by adding a binder resin (resin particles) to the ink.

For example, JP 2021-14516 A discloses an ink containing a pigment, a urethane resin, and a styrene-acrylic resin, in which a dry film of the ink has a breaking point stress of 4.7 N/mm$^2$ or more.

JP 2020-7543 A discloses an inkjet textile printing ink containing a pigment, a water-dispersible resin, a water-soluble organic solvent, and water, in which the water-dispersible resin is a urethane resin having film elongation of 600 to 2000%.

JP 2019-31611 A discloses a textile printing inkjet ink composition containing a pigment, a water-dispersible resin, a crosslinking agent, and water, in which the water-dispersible resin contains a resin having breaking strength of 1200 to 1800% and tensile strength of 10 to 48 MPa. In Examples, a urethane resin is used as the resin.

The inks disclosed in JP 2021-14516 A, JP 2020-7543 A, and JP 2019-31611 A each contain a urethane resin having high breaking elongation, and therefore an image layer easily follows expansion and contraction of a fabric, and favorable friction fastness is easily obtained. However, since these urethane resins have high tensile strength, there is a problem that an image-formed product tends to be hard and texture of a fabric tends to be impaired.

SUMMARY

The present invention has been made in view of the above circumstances, and an object thereof is to provide a textile printing inkjet ink and an image forming method capable of forming an image having high friction fastness while maintaining texture of a fabric.

To achieve the abovementioned object, according to an aspect of the present invention, a textile printing inkjet ink reflecting one aspect of the present invention comprises: a pigment; a water-dispersible resin; and an aqueous medium, wherein the water-dispersible resin has tensile strength of 0.1 to 4.5 MPa at 25° C. and breaking elongation of 500 to 1500% at 25° C.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGURE is a schematic diagram illustrating an outline of a bending test.

DETAILED DESCRIPTION OF EMBODIMENTS

Hereinafter, one or more embodiments of the present invention will be described with reference to the drawings. However, the scope of the invention is not limited to the disclosed embodiments.

As described above, a urethane resin has been conventionally used as a binder resin of a textile printing inkjet ink. The urethane resin exhibits high breaking elongation and thus can enhance friction fastness, but has high tensile strength of 10 MPa or more. Therefore, an image-formed product tends to be hard, and texture of a fabric tends to be impaired.

Meanwhile, the present inventors have found that with an ink containing a water-dispersible resin having at least moderately low tensile strength, specifically, a water-dispersible resin having tensile strength of 0.1 to 4.5 MPa and breaking elongation of 500 to 1500%, an image-formed product is hardly hardened, therefore texture of a fabric can be favorably maintained and an image layer easily follows expansion and contraction of the fabric and is hardly peeled off, and therefore friction fastness can be dramatically enhanced.

In addition, the present inventors have found that, as the water-dispersible resin having such tensile strength and breaking elongation, for example, a water-dispersible resin obtained by introducing a specific structural unit that generates a hydrogen bond into a (meth)acrylic resin is effective. Specifically, in a (meth)acrylic resin containing a structural unit derived from an unsaturated compound having an acidic group or a hydroxy group and a structural unit derived from a (meth)acrylamide, a hydrogen bond is formed between the acidic group or the hydroxy group of the unsaturated compound and an amide bond of the (meth)acrylamide, and therefore it is considered that high breaking elongation is exhibited while tensile strength is low. Hereinafter, an inkjet ink and an image forming method according to an embodiment of the present invention will be described in detail.

1. Inkjet Ink

An inkjet ink (hereinafter, also simply referred to as "ink") according to an embodiment of the present invention is preferably used for inkjet textile printing, and contains a pigment, a water-dispersible resin, and an aqueous medium.

1-1. Pigment

The pigment is not particularly limited, but can be, for example, an organic pigment or an inorganic pigment of the following number described in Color Index.

Examples of an orange or yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 83, C.I. Pigment Yellow 93, C.I. Pigment Yellow 94, C.I. Pigment Yellow 128, C.I. Pigment Yellow 138, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 213.

Examples of red and magenta pigments include Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, and 88, and Pigment Orange 13, 16, 20, and 36.

Examples of blue and cyan pigments include Pigment Blue 1, 15, 15: 1, 15: 2, 15: 3, 15: 4, 15: 6, 16, 17-1, 22, 27, 28, 29, 36, and 60.

Examples of a green pigment include Pigment Green 7, 26, 36, and 50. Examples of a yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of a black pigment include Pigment Black 7, 28, and 26.

Examples of a white pigment include titanium dioxide.

The pigment is preferably further dispersed with a pigment dispersant from a viewpoint of enhancing dispersibility in the ink. The pigment dispersant will be described later.

The pigment may be a self-dispersible pigment. The self-dispersible pigment is obtained by modifying a surface of a pigment particle with a group having a hydrophilic group, and includes the pigment particle and the group having a hydrophilic group, bonded to a surface of the pigment particle.

Examples of the hydrophilic group include a carboxyl group, a sulfonate group, and a phosphorus-containing group. Examples of the phosphorus-containing group include a phosphate group, a phosphonate group, a phosphinate group, a phosphite group, and a phosphate group.

Examples of a commercially available self-dispersible pigment include Cab-O-Jet (registered trademark) 200K, 250C, 260M, and 270V (sulfonate group-containing self-dispersible pigment), Cab-O-Jet (registered trademark) 300K (carboxylic acid group-containing self-dispersible pigment), and Cab-O-Jet (registered trademark) 400K, 450C, 465M, 470V, and 480V (phosphate group-containing self-dispersible pigment), manufactured by Cabot Corporation.

The content of the pigment is not particularly limited, but is preferably 0.3 to 10% by mass, and more preferably 0.5 to 3% by mass with respect to the ink from a viewpoint of easily adjusting a viscosity of the ink within the above range and forming a high density image. When the content of the pigment is equal to or more than the lower limit value, a color of an image tends to be more vivid. When the content of the pigment is equal to or less than the upper limit value, a viscosity of the ink is not too high, and discharge stability is hardly impaired.

1-2. Water-Dispersible Resin

The water-dispersible resin can be contained for the purpose of fixing the pigment or the like to a fabric. The water-dispersible resin is dispersed in a form of particles in the ink. The water-dispersible resin has tensile strength of 0.1 to 4.5 MPa at 25° C. and breaking elongation of 500 to 1500% at 25° C.

When the tensile strength of the water-dispersible resin at 25° C. is 4.5 MPa or less, an image-formed product is not hardened, and therefore texture of the fabric can be maintained. When the tensile strength of the water-dispersible resin is 0.1 MPa or more, stickiness of a surface of an image printed matter can be reduced, and a decrease in friction resistance can be suppressed. The tensile strength of the water-dispersible resin is more preferably 0.5 to 2.5 MPa from a similar viewpoint.

When the breaking elongation of the water-dispersible resin at 25° C. is 500% or more, an image layer easily follows expansion and contraction of the fabric while the texture of the fabric is more favorably maintained, and therefore the image layer is hardly peeled off by friction, and the friction fastness can be enhanced. When the breaking elongation of the water-dispersible resin is 1500% or less, the tensile strength is hardly impaired. The breaking elongation of the water-dispersible resin is preferably 800 to 1200% from a similar viewpoint.

The tensile strength and the breaking elongation of the water-dispersible resin can be measured by the following method in accordance with JIS K 7139.

1) First, a dispersion containing the water-dispersible resin is put in a tray, dried at normal temperature for 12 hours, and then dried at 50° C. for two days to form a sheet. The amount of the dispersion is adjusted to prepare a resin film having a film thickness of 1 mm.
2) The obtained resin film is punched into the shape of a reduced scale test piece A12 in accordance with JIS K 7139 to obtain a test piece. Using a tensile tester, the test piece is elongated under the following conditions, a maximum load until the test piece is broken is measured, and a value obtained by dividing the maximum load by the cross-sectional area of the test piece is defined as the tensile strength. In addition, the test piece is elongated, the length of the test piece that is elongated until the test piece is broken is measured, and a percentage of the length to an original length is defined as the breaking elongation. The tensile test can be performed under the following conditions.

[Measurement Conditions]
Test mode: single
Load cell capacity: 50 N
Control operation: load
Control: stroke
Test speed: 50 mm/min
Measurement temperature: 25° C.

The tensile strength and breaking elongation of the water-dispersible resin can be adjusted by a monomer composition. For example, when the content of a structural unit derived from a monomer having a low glass transition temperature (Tg) of a polymer is increased, the tensile strength of the water-dispersible resin tends to be low. In addition, when a structural unit that generates a hydrogen bond is contained, the breaking elongation of the water-dispersible resin tends to be high.

The water-dispersible resin is not particularly limited as long as the tensile strength and the breaking elongation satisfy the above ranges. In particular, a resin capable of forming a hydrogen bond between resin molecules is preferable, and a (meth)acrylic resin capable of forming a hydrogen bond between resin molecules is more preferable. Note that here, (meth)acryl refers to acryl, methacryl, or both of these.

The (meth)acrylic resin is preferably a polymer containing a structural unit derived from an unsaturated compound having an acidic group or a hydroxy group and a structural unit derived from a (meth)acrylamide. This is because by a hydrogen atom or an oxygen atom of an amide bond constituting the (meth)acrylamide forming a hydrogen bond with the acidic group or the hydroxy group of the unsaturated compound, the breaking elongation of the resin can be increased and the friction fastness can be enhanced. That is, the (meth)acrylic resin is preferably a polymer containing a structural unit (a) derived from a (meth)acrylate, a structural unit (b) derived from an unsaturated compound having an acidic group or a hydroxy group, and a structural unit (c) derived from a (meth)acrylamide.

Regarding Structural Unit (a):

The structural unit (a) is derived from a (meth)acrylate. The (meth)acrylate preferably contains an alkyl (meth) acrylate from a viewpoint of easily adjusting the tensile strength within the above range. The alkyl (meth)acrylate can adjust the Tg and tensile strength of the resin.

The number of carbon atoms in the alkyl group of the alkyl acrylate is, for example, 1 to 20, preferably 4 to 12, and more preferably 4 to 8. Examples of such an alkyl acrylate include butyl acrylate, pentyl acrylate, hexyl acrylate, heptyl acrylate, and 2-ethylhexyl acrylate, and butyl acrylate is preferable.

The number of carbon atoms in the alkyl group of the alkyl methacrylate is, for example, 1 to 20, preferably 1 to 110, and more preferably 1 to 8. Examples of such an alkyl methacrylate include methyl methacrylate, ethyl methacrylate, and propyl methacrylate, and methyl methacrylate is preferable.

For example, an alkyl acrylate is preferable, and an alkyl acrylate having 4 or more carbon atoms is more preferable from a viewpoint of lowering the Tg of the resin and easily lowering the tensile strength. An alkyl methacrylate is preferable, and methyl methacrylate is more preferable from a viewpoint of moderately increasing the tensile strength of the resin. As the structural unit (a), only one type of (meth)acrylate may be used, or two or more types thereof may be used in combination.

The content of the structural unit (a) derived from a (meth)acrylate is not particularly limited, but is preferably 70 to 96% by mass with respect to all structural units constituting the (meth)acrylic resin. When the content is 70% by mass or more, the Tg of the resin can be sufficiently adjusted, and therefore the tensile strength of the resin can be further lowered. When the content is 96% by mass or less, the breaking elongation is hardly lowered. The content is more preferably 80 to 90% by mass with respect to all structural units constituting the (meth)acrylic resin from a similar viewpoint.

Regarding Structural Unit (b):

The structural unit (b) is derived from an unsaturated compound having an acidic group or a hydroxy group. Examples of the acidic group of the unsaturated compound include a carboxy group, a sulfonate group, a phosphate group, and salts thereof. These acidic groups and a hydroxy group can form a hydrogen bond with an amide bond of a (meth)acrylamide.

Examples of the unsaturated compound having a carboxy group include an ethylenically unsaturated carboxylic acid such as acrylic acid, methacrylic acid, crotonic acid, itaconic acid, maleic acid, fumaric acid, or 2-acryloyloxyethyl succinic acid. Examples of the unsaturated compound having a sulfonate group include vinylsulfonic acid, styrenesulfonic acid, and allylsulfonic acid. Examples of the unsaturated compound having a phosphate group include vinylphosphonic acid and 2-((meth)acryloyloxy) ethyl phosphate. Examples of the unsaturated compound having a hydroxy group include a hydroxy group-containing (meth)acrylate such as 2-hydroxy (meth)acrylate.

In particular, the unsaturated compound having an acidic group or a hydroxy group preferably contains an ethylenically unsaturated carboxylic acid or a hydroxy group-containing (meth)acrylate, and more preferably contains an ethylenically unsaturated carboxylic acid.

The content of the structural unit (b) derived from an unsaturated compound having an acidic group or a hydroxy group is not particularly limited, but is preferably 3 to 15% by mass with respect to all structural units constituting the (meth)acrylic resin. When the content is 3% by mass or more, not only dispersibility of the water-dispersible resin in the ink can be further easily enhanced, but also the hydrogen bond can be sufficiently formed, and therefore the breaking elongation can be further enhanced. When the content is 15% by mass or less, a viscosity of a resin dispersion is not too high, and discharge stability of the ink is hardly impaired. The content of the structural unit (b) derived from an unsaturated compound having an acidic group or a hydroxy group is more preferably 3 to 10% by mass with respect to all structural units constituting the (meth)acrylic resin from a similar viewpoint.

Regarding Structural Unit (c):

The structural unit (c) is derived from a (meth)acrylamide. The number of amide bonds included in the (meth)acrylamide may be one or more. The (meth)acrylamide may have a functional group such as a hydroxy group, a carbonyl group, or an acyl group.

Examples of such a (meth)acrylamide include (meth) acrylamide, N-methyl (meth)acrylamide, N-ethyl (meth) acrylamide, N-n-propyl (meth)acrylamide, N-isopropyl (meth)acrylamide, N-butyl (meth)acrylamide, N-cyclohexyl (meth)acrylamide, N-benzyl (meth)acrylamide, N-hydroxymethyl (meth)acrylamide, methoxymethyl (meth) acrylamide, butoxymethyl (meth)acrylamide, N-(2-hydroxyethyl) (meth)acrylamide, N,N-dimethyl (meth) acrylamide, methoxyethyl (meth)acrylamide, phenyl (meth) acrylamide, diacetone acrylamide, and N,N'-methylenebisacrylamide. In particular, a (meth)acrylamide having a functional group such as a carbonyl group or a hydroxy group is preferable, and hydroxyethyl acrylamide, diacetone acrylamide, and the like are more preferable from a viewpoint of easily forming a hydrogen bond with the unsaturated compound having an acidic group or a hydroxy group and further easily enhancing the breaking elongation.

The content of the structural unit (c) derived from a (meth)acrylamide is not particularly limited, but is preferably 1 to 20% by mass with respect to all structural units constituting the (meth)acrylic resin. When the content is 1% by mass or more, a hydrogen bond can be sufficiently formed, and therefore the breaking elongation can be further enhanced. When the content is 20% by mass or less, the texture is hardly impaired. The content of the structural unit (c) derived from a (meth)acrylamide is more preferably 1 to 10% by mass with respect to all structural units constituting the (meth)acrylic resin from a similar viewpoint.

The total content of the structural unit (b) derived from an unsaturated compound having an acidic group or a hydroxy group and the structural unit (c) derived from a (meth) acrylamide is not particularly limited, but is preferably 4% by mass or more with respect to all structural units constituting the (meth)acrylic resin. When the total content is 4% by mass or more, a hydrogen bond can be sufficiently formed, and therefore the breaking elongation can be further enhanced. The total content is more preferably 4 to 20% by mass with respect to all structural units constituting the (meth)acrylic resin from a similar viewpoint. As described above, when the total content is 20% by mass or less, the tensile strength is more easily adjusted within the above range.

A content ratio between the structural unit (c) derived from a (meth)acrylamide and the structural unit (b) derived from an unsaturated compound having an acidic group or a hydroxy group is preferably c/b=30/1 to 9/1 (mass ratio), and more preferably 25/1 to 15/1 (mass ratio) from a viewpoint of favorably forming a hydrogen bond. When c/b is within the above range, a hydrogen bond can be more favorably formed, and therefore the breaking elongation is more easily enhanced. As a result, an image-formed product having high friction fastness is easily obtained.

Regarding Another Structural Unit:

The (meth)acrylic resin may further contain a structural unit derived from a monomer other than the above monomers as necessary. Examples of the other monomer include a styrene (for example, styrene, α-methylstyrene, or vinyltoluene), a saturated fatty acid vinyl (for example, vinyl acetate or vinyl propionate), a vinyl compound (for example, 1,4-divinyloxybutane or divinylbenzene), an allyl compound (for example, diallyl phthalate or triallyl cyanurate), and a polyfunctional (meth)acrylate such as diethylene glycol di(meth)acrylate, 1,6-hexanediol di(meth)acrylate, propylene glycol di(meth)acrylate, or N,N'-methylenebis(acrylamide).

Regarding Physical Properties:

The glass transition temperature Tg of the water-dispersible resin is not particularly limited, but is preferably low from a viewpoint of easily adjusting the tensile strength within the above range and further easily maintaining the texture. The Tg of the water-dispersible resin is, for example, preferably 20° C. or lower, and more preferably −55 to −5° C. The Tg of the water-dispersible resin can be measured by differential scanning calorimetry at a temperature rising rate of 10° C./min in accordance with JIS K 7121.

The Tg of the water-dispersible resin can be adjusted by a type and a monomer composition of the resin. For example, in a case of a (meth)acrylic resin, when the content of the structural unit (a) derived from an alkyl acrylate is increased, the Tg is lowered.

An acid value of the water-dispersible resin is not particularly limited, but is preferably 15 to 100 mgKOH/g and more preferably 20 to 80 mgKOH/g from a viewpoint of further enhancing the friction fastness. The acid value of the water-dispersible resin can be measured in accordance with JIS K 0070.

The acid value of the water-dispersible resin can be adjusted by the content of the structural unit (b). For example, when the content of the structural unit (b) derived from an unsaturated compound having an acidic group is increased, the acid value is increased.

An average particle size of the water-dispersible resin in the ink is not particularly limited, but is preferably 30 to 200 nm, and more preferably 50 to 120 nm, for example, from a viewpoint of dischargeability by inkjet. The average particle size is an average value of primary particle sizes. The average particle size can be measured, for example, as a dispersed particle size (Z-average) in a Zataizer Nano S90 manufactured by Melvern Instruments Ltd.

The content of the water-dispersible resin is not particularly limited, but is preferably 1 to 20 parts by mass with respect to 1 part by mass of the pigment. When the content of the water-dispersible resin is 1 part by mass or more, fixability of the ink to the fabric is more easily enhanced. When the content of the water-dispersible resin is 20 parts by mass or less, the texture is further hardly impaired. The content of the water-dispersible resin is more preferably 3 to 15 parts by mass with respect to 1 part by mass of the pigment from a similar viewpoint.

1-3. Aqueous Medium

The aqueous medium is not particularly limited, but preferably contains water, and preferably further contains a water-soluble organic solvent.

The content of water is, for example, 20 to 70% by mass, and preferably 30 to 60% by mass with respect to the ink.

The water-soluble organic solvent is not particularly limited as long as the water-soluble organic solvent is compatible with water. However, the water-soluble organic solvent preferably makes the ink hardly thickened by drying from a viewpoint that the ink easily permeates a fabric and from a viewpoint that ejection stability in an inkjet method is hardly impaired. Therefore, the ink preferably contains a high-boiling point solvent having a boiling point of 200° C. or higher.

The high-boiling point solvent having a boiling point of 200° C. or higher only needs to be a water-soluble organic solvent having a boiling point of 200° C. or higher, and is preferably a polyol or a polyalkylene oxide.

Examples of the polyol having a boiling point of 200° C. or higher include: a dihydric alcohol such as 1,3 butanediol (boiling point: 208° C.), 1,6 hexanediol (boiling point: 223° C.), or polypropylene glycol; and a trihydric or higher alcohol such as glycerin (boiling point: 290° C.) or trimethylolpropane (boiling point: 295° C.).

Examples of the polyalkylene oxide having a boiling point of 200° C. or higher include a dihydric alcohol ether such as diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.), or polypropylene glycol; and a trihydric or higher alcohol ether such as glycerin (boiling point: 290° C.) or hexanetriol.

The solvent may further contain a solvent other than the high-boiling point solvent. Examples of other solvent include a polyhydric alcohol having a boiling point of lower than 200° C. (for example, ethylene glycol, propylene glycol, or hexanetriol); a polyhydric alcohol ether having a boiling point of lower than 200° C. (for example, ethylene glycol monomethyl ether, ethylene glycol monobutyl ether, diethylene glycol monomethyl ether, diethylene glycol dimethyl ether, propylene glycol monomethyl ether, or propylene glycol monoethyl ether; a monohydric alcohol (for example, methanol, ethanol, propanol, pentanol, hexanol, cyclohexanol, or benzyl alcohol); an amine (for example, ethanolamine, N-ethyldiethanolamine, morpholine, N-ethylmorpholine, ethylenediamine, diethylenediamine, or triethylenetetramine); an amide (for example, formamide, N,N-dimethylformamide, or N,N-dimethylacetamide); a heterocycle (for example, 2-pyrrolidone, N-methyl-2-pyrrolidone, N-cyclohexyl-2-pyrrolidone, 2-oxazolidone, or 1,3-dimethyl-2-imidazolidine), a sulfoxide (for example, dimethylsulfoxide); and a sulfone (for example, sulfolane).

The content of the water-soluble organic solvent is, for example, 20 to 70% by mass, and preferably 30 to 60% by mass with respect to the ink.

1-4. Other Component

The ink may further contain another component as necessary. Examples of the other component include a pigment dispersant, a surfactant, an antiseptic agent, an antifungal agent, and a pH adjuster.

The pigment dispersant is present in the ink so as to surround surfaces of the pigment particles, or is adsorbed to the surfaces of the pigment particles to form a pigment dispersion, thereby dispersing the pigment favorably. The pigment dispersant is preferably a polymer dispersant, and more preferably an anionic polymer dispersant.

The anionic polymer dispersant is a polymer dispersant having a hydrophilic group such as a carboxylic acid group, a phosphorus-containing group, or a sulfonate group, and is preferably a polymer dispersant having a carboxylic acid group.

The polymer dispersant having a carboxylic acid group can be a polycarboxylic acid or a salt thereof. Examples of the polycarboxylic acid include a (co)polymer of a monomer selected from acrylic acid or a derivative thereof, maleic acid or a derivative thereof, itaconic acid or a derivative thereof, and fumaric acid or a derivative thereof, and a salt thereof. Examples of another monomer constituting the copolymer include styrene and vinyl naphthalene.

An anionic group equivalent of the anionic polymer dispersant is preferably, for example, 1.1 to 3.8 meq/g from a viewpoint of sufficiently dispersing the pigment particles. When the anionic group equivalent is within the above range, high pigment dispersibility is easily obtained without increasing the molecular weight of the anionic polymer dispersant. The anionic group equivalent of the anionic polymer dispersant can be determined from an acid value. The acid value can be measured in accordance with HS K0070.

A weight average molecular weight (Mw) of the polymer dispersant is not particularly limited, but is preferably 5000 to 30000. When the Mw of the polymer dispersant is 5000 or more, the pigment particles are easily sufficiently dispersed, and when the Mw of the polymer dispersant is 30000 or less, the ink is not excessively thickened, and therefore permeability into the fabric is hardly impaired. The Mw of the polymer dispersant can be measured by a similar method to the above method.

The content of the polymer dispersant is not particularly limited as long as the content is within a range in which a viscosity is obtained to such an extent that the pigment particles are sufficiently dispersed and permeability into the fabric is not impaired, but is, preferably 20 to 100% by mass, and more preferably 25 to 60% by mass with respect to the pigment.

The ink can further contain a surfactant as necessary. The surfactant can reduce a surface tension of the ink to enhance wettability to the fabric. The type of the surfactant is not particularly limited, but can be, for example, an acetylene glycol based surfactant, a silicone-based surfactant, or a fluorine based surfactant.

Examples of the antiseptic agent or the antifungal agent include an aromatic halogen compound (for example, Preventol CMK), methylene dithiocyanate, a halogen-containing nitrogen sulfur compound, and 1,2-benzisothiazolin-3-one (for example, PROXEL GXL).

Examples of the pH adjuster include citric acid, sodium citrate, hydrochloric acid, and sodium hydroxide.

1-5. Physical Properties

A viscosity of the ink at 25° C. is not particularly limited as long as injectability by an inkjet method is favorable, but is preferably 3 to 20 mPa·s, and more preferably 4 to 12 mPa·s. The viscosity of the ink can be measured by an E-type viscometer at 25° C.

1-6. Preparation of Ink

The ink according to an embodiment of the present invention can be manufactured by any method. For example, the ink according to an embodiment of the present invention can be manufactured through 1) a step of mixing a pigment, a pigment dispersant, and a solvent (water or the like) to obtain a pigment dispersion, and 2) a step of further mixing the obtained pigment dispersion, a dispersion containing the water-dispersible resin (resin particle dispersion), an aqueous medium, and the like.

2. Image Forming Method

An image forming method according to an embodiment of the present invention includes a step of applying the ink onto a fabric by an inkjet method. Specifically, the image forming method includes: 1) a step of applying the ink according to an embodiment of the present invention onto a fabric by an inkjet method (ink applying step); and 2) a step of drying and fixing the ink applied to the fabric (drying and fixing step).

1) Ink Applying Step

The ink is discharged from an inkjet recording head to apply ink droplets onto the fabric.

The type of a fiber material constituting the fabric is not particularly limited, and the fiber material preferably contains: a natural fiber such as cotton (cellulose fiber), hemp, wool, or silk; and a chemical fiber such as rayon, vinylon, nylon, acryl, polyurethane, polyester, or acetate. The fabric may be obtained by forming these fibers into any of a woven fabric, a nonwoven fabric, a knitted fabric, and the like. The fabric may be a blended woven fabric or a blended nonwoven fabric of two or more types of fibers.

For example, when the ink contains an anionic dispersant, the fabric preferably has a cationic group or an acid group at least on a surface thereof from a viewpoint of enhancing an adsorption rate and fixability of the pigment. The fabric having a cationic group or an acid group at least on a surface thereof may be pre-treated or non-pre-treated.

2) Drying and Fixing Step

In the drying step, the ink applied to the fabric is dried to remove a solvent component in the ink. As a result, the pigment is fixed to the fabric to form an image.

A drying method is not particularly limited, and can be a method using a heater, a hot air dryer, a heating roller, or the like. In particular, it is preferable to heat and dry both surfaces of the fabric using a hot air dryer and a heater.

A drying temperature only needs to be set so as to evaporate a solvent component in the ink. Specifically, the drying temperature is preferably equal to or higher than a temperature at which the solvent component evaporates and equal to or lower than (Tg+170)° C. (Tg means the Tg of the resin particles). The drying temperature may be room temperature.

Since the tensile strength of the water-dispersible resin contained in the ink is low, it is difficult to form a hard coating film even if the water-dispersible resin is fused during drying of the ink. As a result, texture of the fabric is hardly impaired. Specifically, a difference in bending torque force in a bending test between a fabric on which an image is formed under a predetermined condition and a fabric before an image is formed is preferably gf·cm or less, more preferably 0.004 gf·cm or less, and still more preferably 0.002 gf·cm or less.

The bending test can be performed by the following procedure. FIGURE is a schematic diagram illustrating an outline of the bending test.

1) First, an image is formed on a cotton fabric using the ink such that an adhesion amount of the water-dispersible resin (an adhesion amount of a resin containing the water-dispersible resin) is 34.65 g/m². The image-formed fabric is cut into a size of 5×20 cm to obtain a sample piece 1. Subsequently, as illustrated in FIGURE, one end A of the sample piece 1 in a length direction and a position B 3 cm away from the end are pinched by clips of a bending tester. Then, the end A is rotated with the position B as a base point, and a force required when the sample piece 1 is bent until a curvature of the sample piece 1 near the position B reaches 2.5 $cm^{-1}$ (bending torque of an image forming portion) is measured.
2) A similar test is performed also on a fabric (a sample piece of 5×20 cm) on which no image is formed (bending torque of a white portion).
3) A difference between the bending torques obtained in the above 1) and 2) is calculated.

As the bending tester, for example, a KES-FB2-A pure bending tester (Kato Tech Co., Ltd.) can be used. The "adhesion amount of a resin containing the water-dispersible resin" can be determined by calculation from an ink adhesion amount of the fabric and a resin concentration of the ink. Note that when another liquid such as a post-treatment liquid is further applied after the ink is applied, the "adhesion amount of a resin containing the water-dispersible resin" means a sum of an adhesion amount of a resin contained in the ink and an adhesion amount of a resin contained in the other liquid. Note that an adhesion amount of the water-dispersible resin out of the adhesion amount of the resin can be determined also by calculation from an ink composition.

The difference in bending torque can be adjusted by the type of water-dispersible resin (mainly tensile strength) when an adhesion amount of the pigment is constant. For example, when the water-dispersible resin is a (meth)acrylic resin, if the structural unit (a) is derived from an alkyl acrylate or the content of the structural unit (a) is a certain level or more, the tensile strength tends to be moderately low, and the difference in bending torque tends to be small.

In addition, since the breaking elongation of the water-dispersible resin contained in the ink is high, an obtained image-formed product also has high friction fastness. Specifically, dry friction fastness of a fabric on which an image is formed in accordance with JIS L0849 is preferably grade 3 or higher, and more preferably grade 4 or higher.

The dry friction fastness can be measured by the following procedure.

The obtained image-formed product is subjected to a dry friction fastness test with a type II tester in accordance with JIS L0849 (2013), and evaluated using a discoloration gray scale. Specifically, friction is applied to a portion where an image is formed by reciprocating a cotton fabric 100 times under a load of 200 g in a region having a size of 100 mm in a lateral direction and a size of 100 mm in a longitudinal direction. After the friction is applied, a density of a color adhering to the cotton fabric is judged by a grade corresponding to the same density of the discoloration gray scale.

The dry friction fastness can be adjusted by the type (specifically, breaking elongation) of the water-dispersible resin when an adhesion amount of the pigment is constant. For example, when the water-dispersible resin is a (meth) acrylic resin, if the total content of the structural unit (b) and the structural unit (c) is large, the breaking elongation tends to be high and the dry friction fastness tends to be high.

The image forming method according to an embodiment of the present invention may further include 3) a step of pretreating a fabric (pretreatment step) and 4) a step of applying a post-treatment liquid (post-treatment step) as necessary.

Regarding Step of 3) (Pretreatment Step)

In the pretreatment step, a pretreatment liquid is applied to a fabric. The type of the pretreatment liquid can be selected according to the composition of the ink. For example, when the ink contains an anionic polymer dispersant, the pretreatment liquid preferably contains a compound having an acid group or a cationic group.

The compound having a cationic group is not particularly limited, and may be similar to a cationic surfactant, or may be a polymer compound having a cationic group, or the like. Examples of the polymer compound having a cationic group include: a plant skin such as pectinic acid; a cellulose derivative such as carboxymethyl cellulose; a processed starch such as a carboxymethyl starch or a carboxyethyl starch; and a synthetic starch such as an acrylic polymer containing an acrylic acid as a copolymer component, such as an acrylic acid-acrylate copolymer or a styrene-acrylic acid copolymer.

A method for applying the pretreatment liquid is not particularly limited, and can be, for example, a pad method, a coating method, a spray method, or an inkjet method. The pretreatment liquid applied to the fabric can be heated and dried using hot air, a hot plate, or a heat roller.

Regarding Step of 4) (Post-Treatment Step)

In the post-treatment step, a post-treatment liquid is applied onto the ink applied to the fabric.

The post-treatment liquid can be applied by a similar method to the method for applying the pre-treatment liquid. In particular, a spray method and an inkjet method are preferable.

3. Image-Formed Product

An obtained image-formed product includes a fabric and an image layer disposed on the fabric.

The image layer contains a component derived from the ink, and may further contain a component derived from another liquid such as a post-treatment liquid as necessary. For example, the image layer includes an ink layer, and may further include another layer such as a post-treatment layer as necessary.

As described above, the image layer contains a water-dispersible resin derived from the ink and having tensile strength and breaking elongation adjusted within predetermined ranges. Therefore, the obtained image-formed product has favorable friction fastness while maintaining favorable texture.

EXAMPLES

Hereinafter, the present invention will be described with reference to Examples. The scope of the present invention is not construed as being limited by Examples.

1. Preparation of Dispersion of Water-Dispersible Resin (Resin Dispersion)

<Monomer>

Alkyl (meth)acrylate

Methyl methacrylate (MMA)

Butyl acrylate (BA)

Unsaturated compound having acidic group or hydroxy group

Methacrylic acid (MAA)

(Meth)acrylamide
Acrylamide
Dimethyl acrylamide
Hydroxyethyl acrylamide
Diacetone acrylamide <Preparation of Resin Dispersion a>

Into a separable flask equipped with a stirrer, a temperature sensor, a cooling tube, and a nitrogen introduction device, an activator solution in which 2.52 g of an anionic activator (sodium dodecylbenzene sulfonate: SDS) and 0.58 g of sodium carbonate were dissolved in 553 g of deionized water in advance was put, and the internal temperature was raised to 80° C. while the mixture was stirred at a stirring speed of 330 rpm under a nitrogen stream.

Meanwhile, 143 g of n-butyl acrylate (BA), 44 g of methyl methacrylate (MMA), 22 g of methacrylic acid, and 11 g of acrylamide were dissolved to prepare a monomer solution.

Subsequently, a solution in which 0.07 g of a polymerization initiator (potassium persulfate: KPS) was dissolved in 2.66 g of deionized water was prepared and heated at 80° C. To this solution, the prepared monomer solution was added dropwise over 60 minutes and stirred to prepare a dispersion of resin particles.

Furthermore, after completion of the dropwise addition, the mixture was heated and stirred for 120 minutes. Thereafter, a solution in which 0.07 g of a polymerization initiator (potassium persulfate: KPS) was dissolved in 2.66 g of deionized water was further added thereto, and the mixture was stirred for 60 minutes and then cooled to 40° C. to obtain a resin particle dispersion a.

<Preparation of Resin Dispersions b to f>

Resin particle dispersions b to f were obtained in a similar manner to the resin particle dispersion a except that the types and blending amounts of the monomers were changed such that the ratios illustrated in Table 1 were used for monomer compositions.

<Resin Dispersion g>

Impranil DLP-R Sumika Covestro Urethane (polyurethane)

<Resin Dispersion h>

Mowinyl 6969D (styrene-acrylic resin) manufactured by The Nippon Synthetic Chemical Industry Co., Ltd.

<Preparation of Resin Dispersion i>

Into a separable flask equipped with a stirrer, a temperature sensor, a cooling tube, and a nitrogen introduction device, an activator solution in which 2.52 g of an anionic activator (sodium dodecylbenzene sulfonate: SDS) and 0.58 g of sodium carbonate were dissolved in 553 g of deionized water in advance was put, and the internal temperature was raised to 80° C. while the mixture was stirred at a stirring speed of 330 rpm under a nitrogen stream.

Meanwhile, 156 g of n-butyl acrylate (BA), 44 g of methyl methacrylate (MMA), 15.4 g of methacrylic acid, and 11 g of acrylamide were dissolved to prepare a monomer solution.

Subsequently, a solution in which 0.07 g of a polymerization initiator (potassium persulfate: KPS) was dissolved in 2.66 g of deionized water was prepared and heated at 80° C. To this solution, the prepared monomer solution was added dropwise over 60 minutes and stirred to prepare a dispersion of resin particles.

Furthermore, after completion of the dropwise addition, the mixture was heated and stirred for 120 minutes. Thereafter, a solution in which 0.07 g of a polymerization initiator (potassium persulfate: KPS) was dissolved in 2.66 g of deionized water was further added thereto, and the mixture was stirred for 60 minutes and then cooled to 40° C. to obtain a resin particle dispersion i.

Evaluation

The tensile strength, breaking elongation, and average particle size of resin particles constituting each of the obtained resin dispersions were measured by the following methods.

(1) Tensile Strength and Breaking Elongation

Each of the resin dispersions prepared above was immersed in a tray processed with polytetrafluoroethylene, dried at normal temperature for 12 hours, and then dried at 50° C. for two days to form a sheet. An immersion amount was adjusted, and a resin film having a film thickness of 1 mm was prepared.

The obtained resin film was punched into the shape of a reduced scale test piece A12 in accordance with JIS K 7139 to obtain a test piece. Then, using a tensile tester, the test piece was elongated under the following conditions, a maximum load until the test piece was broken was measured, and a value obtained by dividing the maximum load by the cross-sectional area of the test piece was defined as the tensile strength. In addition, the test piece was elongated, the length of the test piece that was elongated until the test piece was broken was measured, and a percentage of the length to an original length was defined as the breaking elongation. A tensile test was performed under the following conditions.

[Measurement Conditions]

Measuring apparatus: tabletop precision universal tester (Autograph AGS-5kNX manufactured by Shimadzu Corporation)

Test mode: single

Test type: Tensile

Load cell capacity: 50 N

Control operation: load

Control: stroke

Test speed: 50 mm/min

Measurement temperature: 25° C.

Number of batches: 1

Number of subbatches: 1

(2) Average Particle Size

The dispersion particle size (Z-average) of resin particles in each of the resin dispersions was measured by a Zataizer Nano S90 manufactured by Melvern Instruments Ltd. The dispersion particle sizes of the resin particles were all 60 to 100 μm.

(3) Acid Value

The resin particles of the resin particle dispersions a to i were collected, and acid values thereof were measured in accordance with JIS K0070. As a result, the acid values were all 64 mgKOH/g.

The compositions and physical properties of the resin dispersions a to i are illustrated in Table 1. Note that when the Tg of the obtained resin particles was measured at a temperature rising rate of 10° C./min in accordance with JIS K7121, it was found that the Tg was around −50 to −30° C. although no clear peak was observed.

TABLE 1

| | (Meth)acrylate (% by mass) | | | Unsaturated compound having acidic group or hydroxy group (% by mass) | (Meth)acrylamide (% by mass) | | Tensile strength (MPa) | Breaking elongation (%) |
|---|---|---|---|---|---|---|---|---|
| | BA | MMA | MAA | | Type | Content | | |
| a | 65 | 20 | 10 | | Acrylamide | 5 | 3 | 800 |
| b | 65 | 20 | 10 | | Dimethyl acrylamide | 5 | 4.1 | 750 |
| c | 65 | 20 | 10 | | Hydroxyethyl acrylamide | 5 | 2.1 | 900 |
| d | 65 | 20 | 10 | | Diacetone acrylamide | 5 | 1.8 | 1200 |
| e | 70 | 20 | 10 | | — | 0 | 2 | 350 |
| f | 70 | 25 | 0 | | Acrylamide | 5 | 2 | 400 |
| g | Impranil DLP-R Sumika Covestro Urethane (urethane resin) | | | | | | 10 | 1600 |
| h | Mowinyl 6969D (styrene-acrylic resin manufactured by The Nippon Synthetic Chemical Industry Co., Ltd.) | | | | | | 6 | 350 |
| i | 68 | 20 | 7 | | Acrylamide | 5 | 2.5 | 950 |

2. Preparation and Evaluation of Ink
<Preparation of Pigment Dispersion>

With 7 parts by mass of a styrene-butyl acrylate-methacrylic acid copolymer (anionic dispersant, weight average molecular weight: 16000, anionic group equivalent: 3.5 meq/g) as a pigment dispersant, 78 parts by mass of water was mixed, and then the mixture was heated and stirred to prepare a neutralized pigment dispersant. To this mixed liquid, 15 parts by mass of C.I. Pigment Blue 15:3 was added, and the mixture was premixed and then dispersed using a sand grinder filled with 0.5 mm zirconia beads at a volume ratio of 50% to obtain a cyan pigment dispersion having a pigment concentration of 15% by mass.

<Preparation of Ink 1>

Subsequently, the following components were mixed such that a total amount was 100 parts by mass to obtain an ink 1.

Pigment dispersion prepared above: 10 parts by mass (solid content: 1.5 parts by mass)
Resin dispersion 1 prepared above: 45 parts by mass (solid content: 13.5 parts by mass)
Ethylene glycol: 10 parts by mass
Propylene glycol: 10 parts by mass
Glycerin: 10 parts by mass
OLFIN E1010 (acetylene glycol-based surfactant manufactured by Nissin Chemical Industry Co., Ltd.): 0.10 parts by mass
Proxel GXL (manufactured by Lonza Japan): 0.10 parts by mass
Deionized water: balance <Preparation of Inks 2 to 9>

Inks 2 to 9 were prepared in a similar manner to the ink 1 except that the resin dispersion was changed to those presented in Table 2.

Evaluation

Using the obtained inks 1 to 9, an image was formed, and dry friction fastness and texture were evaluated.

Image Formation

Cotton satin (100% cotton) was prepared as a fabric. Subsequently, an image forming test was performed using each of the inks prepared above.

First, an inkjet head (Konica Minolta head #204) was prepared as an image forming apparatus. Then, each of the inks prepared above was discharged from the head to form a solid image. Each of the inks was discharged at 540 dpi in main scanning×720 dpi in sub scanning. Note that the dpi represents the number of ink droplets (dots) per 2.54 cm. A discharge frequency was 22.4 kHz. Then, the fabric to which each of the inks had been applied was dried at 120° C. for five minutes in a belt conveyance type dryer to obtain an image-formed product. Note that a resin adhesion amount of each of the inks 1 to 9 was 34.65 g/m². The resin adhesion amount here means an adhesion amount of the water-dispersible resin.

(1) Dry Friction Fastness

The obtained image-formed product was subjected to a dry friction fastness test with a type II tester in accordance with drying conditions of JIS L0849 (2013), and evaluated using a discoloration gray scale. Specifically, friction was applied to a portion where an image was formed by reciprocating a cotton fabric 100 times under a load of 200 g in a region having a size of 100 mm in a lateral direction and a size of 100 mm in a longitudinal direction. After the friction was applied, a density of a color adhering to the cotton fabric was judge with a grade corresponding to the same density of the discoloration gray scale.

⊙: grade 4-5 to grade 5
○: grade 3-4 to grade 4
Δ: grade 2-3 to grade 3
x: grade 2 or lower If an image-formed product was evaluated to be Δ or higher, the image-formed product was determined to be within an acceptable range.

(2) Texture

The obtained image-formed product was subjected to the following bending test.

1) The image-formed fabric was cut into a size of 5×20 cm to obtain a sample piece 1. Subsequently, as illustrated in FIGURE, one end A of the sample piece 1 in a length direction and a position B 3 cm away from the end were pinched by clips of a bending tester KES-FB2-A pure bending tester (Kato Tech Co., Ltd.). Then, the end A was rotated with the position B as a base point, and a force required when the sample piece 1 was bent until a curvature of the sample piece 1 near the position B reached 2.5 cm$^{-1}$ (bending torque of an image forming portion) was measured.
2) A similar test was performed also on a fabric (a sample piece of 5×20 cm) on which no image was formed (bending torque of a white portion).
3) A difference between the bending torques obtained in the above 1) and 2) was calculated.

Then, bendability was evaluated according to the following criteria.
◎: A difference in bending torque is 0.002 gf·cm or less.
○: A difference in bending torque is more than 0.002 gf·cm and 0.004 gf·cm or less
Δ: A difference in bending torque is more than 0.004 gf·cm and 0.006 gf·cm or less
x: A difference in bending torque is more than 0.006 gf·cm If an image-formed product was evaluated to be Δ or higher, the image-formed product was determined to be within an acceptable range.

Evaluation results of the inks 1 to 9 are presented in Table 2.

TABLE 2

| | Pigment | | Resin dispersion Solid content | | Solvent | | | Tensile strength | Breaking elongation | Evaluation | | |
|---|---|---|---|---|---|---|---|---|---|---|---|---|
| Ink | (parts by mass) | Type | (parts by mass) | EG | PG | Gly | | (MPa) | (%) | Friction fastness | Texture | Note |
| 1 | 1.5 | a | 13.5 | 10 | 10 | 10 | | 3 | 800 | ◎ | ○ | Example |
| 2 | 1.5 | b | 13.5 | 10 | 10 | 10 | | 4.1 | 750 | ○ | ○ | Example |
| 3 | 1.5 | c | 13.5 | 10 | 10 | 10 | | 2.1 | 900 | ◎ | ◎ | Example |
| 4 | 1.5 | d | 13.5 | 10 | 10 | 10 | | 1.8 | 1200 | ◎ | ◎ | Example |
| 5 | 1.5 | g | 13.5 | 10 | 10 | 10 | | 10 | 1600 | ◎ | x | Comparative Example |
| 6 | 1.5 | h | 13.5 | 10 | 10 | 10 | | 6 | 350 | x | x | Comparative Example |
| 7 | 1.5 | e | 13.5 | 10 | 10 | 10 | | 2 | 350 | x | ○ | Comparative Example |
| 8 | 1.5 | f | 13.5 | 10 | 10 | 10 | | 2 | 400 | x | ○ | Comparative Example |
| 9 | 1.5 | i | 13.5 | 10 | 10 | 10 | | 2.5 | 950 | ◎ | ◎ | Example |

As presented in Table 2, it can be found that the inks 1 to 4 and 9 (Examples) each containing a water-dispersible resin having tensile strength and breaking elongation within predetermined ranges have high friction fastness while maintaining the texture of the fabric.

Meanwhile, it can be found that the image-formed products using the inks 5 and 6 (Comparative Examples) each have low texture. This is presumed to be because the water-dispersible resins each have high tensile strength. In addition, it can be found that the image-formed products using the inks 7 and 8 (Comparative Examples) each have low friction fastness. This is presumed to be because the water-dispersible resins each have low tensile elongation.

According to an embodiment of the present invention, it is possible to provide a textile printing inkjet ink and an image forming method capable of forming an image having high friction fastness while maintaining texture of a fabric.

Although embodiments of the present invention have been described and illustrated in detail, the disclosed embodiments are made for purposes of illustration and example only and not limitation. The scope of the present invention should be interpreted by terms of the appended claims.

What is claimed is:

1. A textile printing inkjet ink comprising: a pigment; a water-dispersible resin; and an aqueous medium, wherein
the water-dispersible resin is a (meth)acrylic resin,
the (meth)acrylic resin contains a structural unit derived from an unsaturated compound having an acidic group or a hydroxy group and a structural unit derived from a (meth)acrylamide, and
the water-dispersible resin has tensile strength of 0.1 to 4.5 MPa at 25° C. and breaking elongation of 500 to 1500% at 25° C.

2. The textile printing inkjet ink according to claim 1, wherein
the unsaturated compound having an acidic group or a hydroxy group contains an ethylenically unsaturated carboxylic acid.

3. The textile printing inkjet ink according to claim 1, wherein
a total content of the structural unit derived from a (meth)acrylamide and the structural unit derived from an unsaturated compound having an acidic group or a hydroxy group is 1 to 10% by mass with respect to all structural units constituting the (meth)acrylic resin.

4. The textile printing inkjet ink according to claim 1, wherein
the (meth)acrylic resin further contains a structural unit derived from an alkyl acrylate.

5. The textile printing inkjet ink according to claim 1, wherein
a content of the water-dispersible resin is 1 to 20 parts by mass with respect to 1 part by mass of the pigment.

6. An image forming method for forming an image by discharging an inkjet ink containing a pigment, a water-dispersible resin, and an aqueous medium onto a fabric by an inkjet method, wherein
the water-dispersible resin is a (meth)acrylic resin,
the (meth)acrylic resin contains a structural unit derived from an unsaturated compound having an acidic group or a hydroxy group and a structural unit derived from a (meth)acrylamide,
when an image is formed on a cotton fabric such that an adhesion amount of a resin containing the water-dispersible resin is 34.65 g/m$^2$, a difference in bending torque in a bending test between the fabric on which the image is formed and the fabric before the image is formed is 0.006 gf·cm or less, and
the fabric on which the image is formed has dry friction fastness of grade 3 or higher in accordance with JIS L0849.

7. The image forming method according to claim 6, wherein
the water-dispersible resin has tensile strength of 0.1 to 4.5 MPa at 25° C. and breaking elongation of 500 to 1500% at 25° C.

* * * * *